(12) United States Patent
Pollack

(10) Patent No.: US 9,050,993 B2
(45) Date of Patent: Jun. 9, 2015

(54) FOLDABLE STROLLER AND AUTOMATIC FOLDING TRAY FOR SAME

(71) Applicant: Thomas John Pollack, Atlanta, GA (US)

(72) Inventor: Thomas John Pollack, Atlanta, GA (US)

(73) Assignee: Graco Children's Products Inc., Atlanta, GA (US)

(*) Notice: Subject to any disclaimer, the term of this patent is extended or adjusted under 35 U.S.C. 154(b) by 57 days.

(21) Appl. No.: 13/755,898

(22) Filed: Jan. 31, 2013

(65) Prior Publication Data

US 2013/0207369 A1  Aug. 15, 2013

Related U.S. Application Data

(60) Provisional application No. 61/594,346, filed on Feb. 2, 2012.

(51) Int. Cl.
*B62B 7/06* (2006.01)
*B62B 9/12* (2006.01)

(52) U.S. Cl.
CPC ....................................... *B62B 9/12* (2013.01)

(58) Field of Classification Search
CPC ............ B62B 7/062; B62B 7/064; B62B 7/10
USPC .......................................... 280/642, 647, 650
See application file for complete search history.

(56) References Cited

U.S. PATENT DOCUMENTS

| | | | | |
|---|---|---|---|---|
| 5,257,799 A * | 11/1993 | Cone et al. | ..................... | 280/642 |
| 6,368,006 B1 * | 4/2002 | Yang et al. | ...................... | 403/84 |
| 6,478,327 B1 * | 11/2002 | Hartenstine et al. | .......... | 280/642 |
| 6,666,473 B2 * | 12/2003 | Hartenstine et al. | .......... | 280/647 |
| 6,910,708 B2 * | 6/2005 | Sack et al. | ..................... | 280/642 |
| 6,910,709 B2 * | 6/2005 | Chen | .............................. | 280/642 |
| 7,044,497 B2 * | 5/2006 | Hartenstine et al. | .......... | 280/642 |
| 7,686,322 B2 * | 3/2010 | Longenecker et al. | ....... | 280/642 |
| 7,717,457 B2 * | 5/2010 | Bearup et al. | ................. | 280/647 |
| 7,862,069 B2 * | 1/2011 | King | .............................. | 280/650 |
| 8,262,124 B2 * | 9/2012 | Longenecker et al. | ....... | 280/650 |
| 8,419,025 B2 * | 4/2013 | Chen et al. | ................. | 280/47.36 |
| 8,444,170 B2 * | 5/2013 | Chen et al. | ..................... | 280/642 |
| 8,474,854 B2 * | 7/2013 | Dean et al. | ..................... | 280/647 |
| 8,590,919 B2 * | 11/2013 | Yi | ................................. | 280/642 |
| 8,602,442 B2 * | 12/2013 | Li | ................................. | 280/647 |
| 8,714,581 B2 * | 5/2014 | Fritz et al. | ..................... | 280/642 |

(Continued)

OTHER PUBLICATIONS

"Freestyle" Baby Trend Freestyle Stroller Instruction Manual, 2010, 12 pgs., Baby Trend, Inc.

(Continued)

*Primary Examiner* — Jeffrey J Restifo
(74) *Attorney, Agent, or Firm* — Lempia Summerfield Katz LLC

(57) ABSTRACT

A stroller has a frame reconfigurable between an in-use configuration and a folded configuration. A fold joint on the frame, when in a latched orientation, retains the frame in the in-use configuration. A seat is supported by the frame and a tray extends across and is spaced forward from the seat assembly. The fold joint is coupled to a portion of the tray and is configured to: a) move the tray to a deployed position relative to the seat when the frame is moved to the in-use configuration; b) retain the tray in the deployed position when in the in-use orientation; and c) release and allow the tray to move to a folded position when the frame is moved to the folded configuration. The fold joint is configured to hide and covers the various fold latch and tray fold components.

20 Claims, 11 Drawing Sheets

(56) References Cited

U.S. PATENT DOCUMENTS

| | | | |
|---|---|---|---|
| 2003/0080536 A1* | 5/2003 | Hartenstine et al. | 280/642 |
| 2003/0094791 A1* | 5/2003 | Hartenstine et al. | 280/642 |
| 2003/0168833 A1* | 9/2003 | Chen | 280/642 |
| 2004/0090046 A1* | 5/2004 | Hartenstine et al. | 280/642 |
| 2007/0262565 A1* | 11/2007 | Bearup et al. | 280/642 |
| 2011/0248477 A1* | 10/2011 | Chen et al. | 280/647 |
| 2012/0126512 A1* | 5/2012 | Kane et al. | 280/647 |
| 2013/0001927 A1* | 1/2013 | Mellinger | 280/647 |
| 2013/0140797 A1* | 6/2013 | Fritz et al. | 280/649 |
| 2013/0207369 A1* | 8/2013 | Pollack | 280/650 |

OTHER PUBLICATIONS

"Ride" Baby Trend Ride Stroller Instruction Manual, 2011, 12 pgs., Baby Trend, Inc.

"Nuna Pepp Instruction Manual", date unknown, 41 pgs., Nuna Baby Essentials, Inc.

* cited by examiner

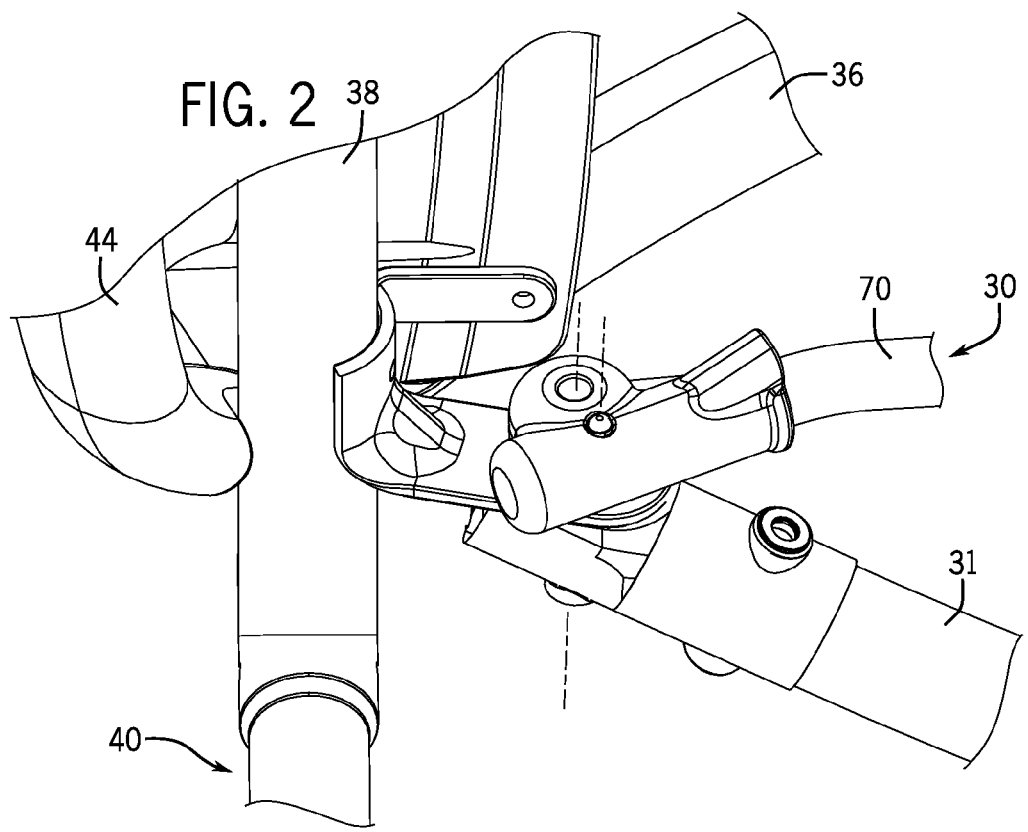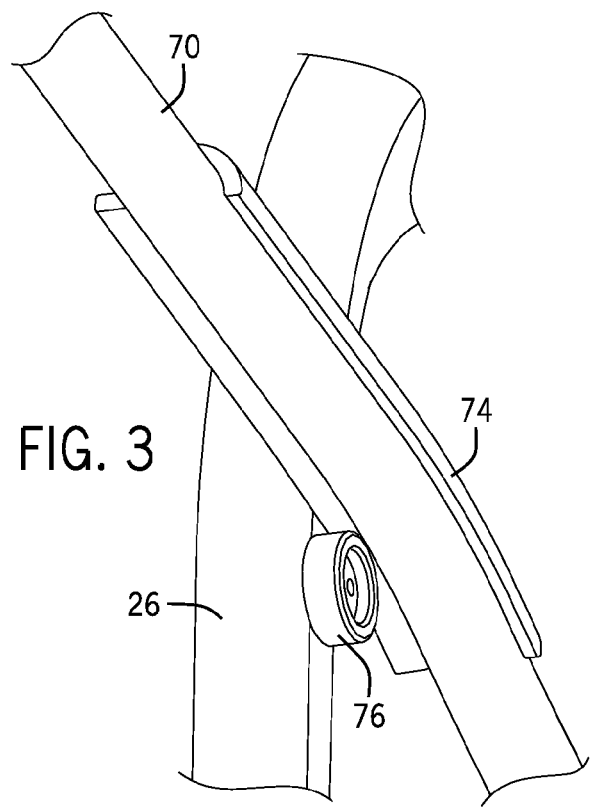

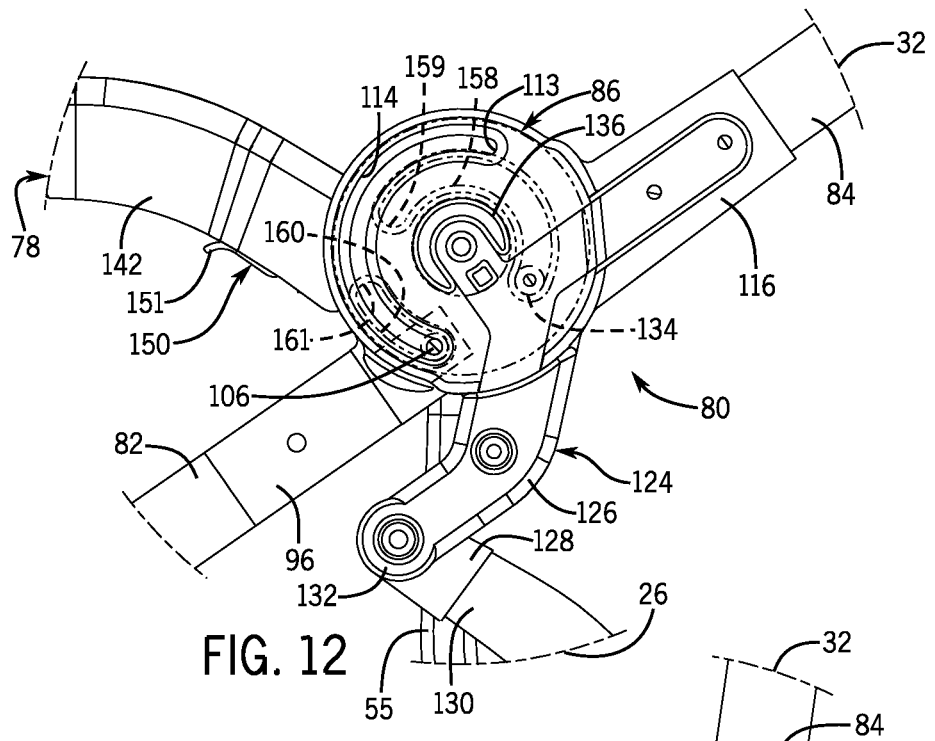
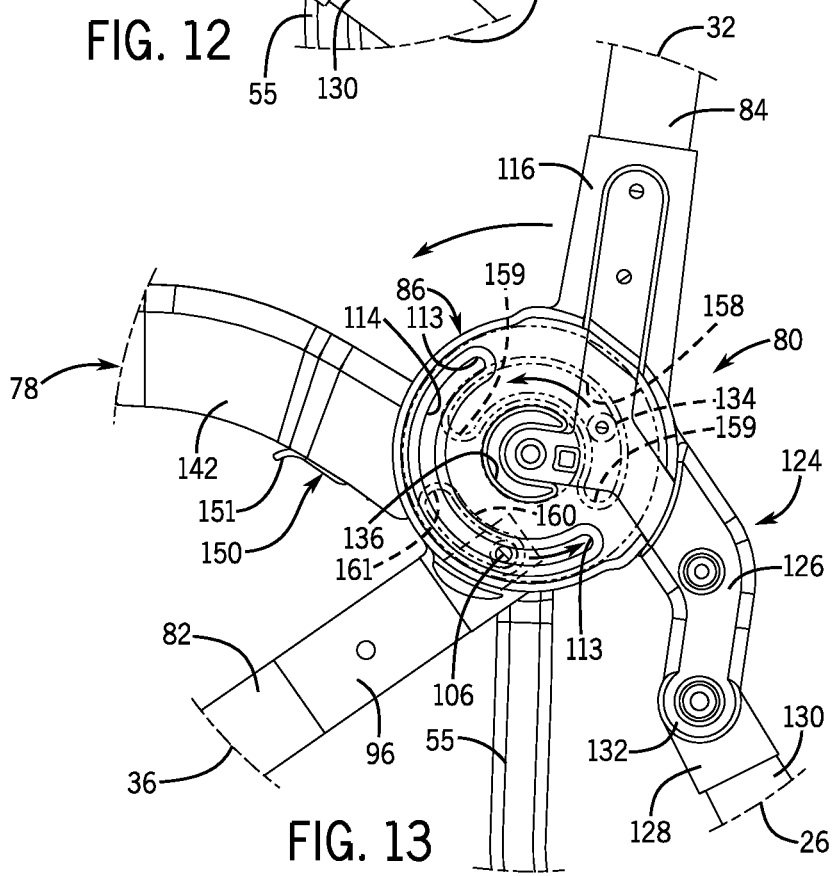

FOLDABLE STROLLER AND AUTOMATIC FOLDING TRAY FOR SAME

RELATED APPLICATION DATA

This patent is related to and claims priority benefit of U.S. provisional application Ser. No. 61/594,346 filed on Feb. 2, 2012 and entitled "Automatic Folding Tray and Foldable Stroller." The entire content of this prior filed provisional application is hereby incorporated herein by reference.

BACKGROUND

1. Field of the Disclosure

The present disclosure is generally directed to foldable strollers, and more particularly to a child seat tray for such a stroller that automatically folds and deploys with folding and unfolding of the stroller.

2. Description of Related Art

Strollers that fold up from an in-use configuration to a smaller, more compact folded configuration are well known. It is desirable for foldable strollers to have a small overall folded size when folded. Many stroller models also have a tray (or an arm bar) that is positioned across the child seat for use and access by a child occupant of the seat during use. In order to deliver a small fold size, the child's tray must not impede folding of the stroller, increase the size of the folded stroller, or increase the overall box boundaries required to ship a stroller.

On many strollers, the tray is designed to be removable prior to folding. This can cause difficulty for the consumer, requiring separate, additional action on their part to remove and reinstall the tray and to stow and relocate the tray. The tray also requires additional storage space for the tray beyond that for the folded stroller. In some instances, the tray is capable of remaining on the stroller when folded. However, the tray then interferes with the folding frame structure and can often impact the size and shape of the folded stroller.

There are some strollers, such as the Graco Quattro and Graco Stylus models, that include relatively complex and exposed linkages, i.e., separate tubes and joints, to automatically articulate the child's tray during folding. These linkages add weight, cost, part complexity, components, and manufacturing complexity to the product. A few strollers are known that offer a more minimalistic approach to folding the child's tray with the stroller. Examples of such products include the Nuna Pepp stroller (see http://www.nuna.eu/pepp), the Babies R' Us by Baby Trend Ride Stroller—BabyTech (see http://www.toysrus.com/product/index.jsp?productId=11024097), and the Baby Trend Freestyle stroller (see http://www.babytrend.com/travel_systems_stroller/TS39963.html).

The Nuna Pepp stroller utilizes a cable under tension to keep the tray erect or deployed when the stroller is in the in-use configuration. When the Nuna Pepp stroller is folded, the cable gives slack. This allows the tray to automatically fall under its own weight during folding.

The BabyTech stroller utilizes hard stops found in the fold latch to move the tray during folding. When the stroller is folded, the tray is released from the hard stops and is allowed to go 'limp' and fall under its own weight. When the stroller is unfolded to the in-use configuration, the tray stays limp. The caregiver must then manually lift the child's tray back into the in-use position. The Freestyle stroller uses a mechanism whereby child's tray automatically falls limp when the stroller is folded. The tray is automatically erected or deployed when the stroller is set up. However, when the tray is unfolding from the folded position to the deployed position, the tray exposes an opening that closes up. These openings can create safety hazards for the caregiver and children nearby.

SUMMARY

In one example according to the teachings of the present invention, a stroller has a frame assembly reconfigurable between an in-use configuration and a folded configuration. A fold joint on the frame assembly, when in a latched orientation, retains the frame assembly in the in-use configuration. A seat assembly is supported by the frame assembly. A tray extends across and is spaced forward from the seat assembly. The fold joint is coupled to a portion of the tray and is configured to: a) move the tray to a deployed position relative to the seat assembly when the frame assembly is moved to the in-use configuration; b) retain the tray in the deployed position when in the in-use orientation; and c) release and allow the tray to move to a folded position when the frame assembly is moved to the folded configuration.

In one example, the fold joint can have a fold slot and a fold pin that is captured within the fold slot.

In one example, the fold joint can have a fold pin that is held stationary and can have a fold slot that moves about the pivot axis with part of the frame assembly.

In one example, the frame assembly can include a handle assembly that is pivoted about the fold joint to reconfigure the frame assembly between the folded and unfolded configurations.

In one example, the fold joint can have a fold latch, a fold pin, a fold slot, a tray boss captured within a first track, and a second track. The fold pin can be captured within the fold slot and the second track.

In one example, the fold joint can include a hub that covers and hides a fold latch, a fold pin, a fold slot, a tray boss, and first and second tracks of the fold joint, whether the fold joint is in the in-use orientation or a folded orientation or moving therebetween.

In one example, fold joint can have first and second hub parts pivotally coupled to one another and can have a third hub part coupled to the tray and being pivotable about a pivot axis relative to the first and second hub parts.

In one example, the fold joint can include first, second, and third hub parts that combine to form a hub.

In one example, the fold joint can have a fold latch, a fold pin, a fold slot, a tray boss captured within a first track, and a second track. The fold pin can be captured within the fold slot and the second track.

In one example, the fold joint can have first, second, and third hub parts that define a hub that can cover and hide a fold latch, a fold pin, a fold slot, a tray boss, and first and second tracks, whether the fold joint is in the in-use orientation or a folded orientation or moving therebetween.

In one example according to the teachings of the present invention, a fold joint for a stroller includes a first hub part fixed to a first frame element and a second hub part fixed to a second frame element. The first and second hub parts are pivotable relative to one another about a pivot axis between an in-use orientation and a folded orientation. A latch shuttle is movable between a latched position locking the first and second latch parts in the in-use orientation and an unlatched position unlocking the first and second latch parts. A fold pin is carried on one of the first and second hub parts and a fold slot is carried on the other of the first and second latch hub parts at a radial distance from the pivot axis. A tray has a tray part coupled to and pivotable about the pivot axis relative to the first and second hub parts. The tray part has a first track at the same radial distance from the pivot axis. The fold pin is captured in both the fold slot and the track and which, at least in part, controls movement of the tray when the fold joint is reoriented between the in-use and folded orientations.

In one example, the first frame element can be a front leg of a frame assembly of the stroller and the second frame element can be a push arm of a handle assembly of the frame assembly.

In one example, the second hub part can have a pair of plates that are spaced apart from one another. The pivot axis can be defined through and generally perpendicular to the pair of plates. The first hub part can have a disc sandwiched between the pair of plates.

In one example, the second hub part can have two of the fold slots and a pair of plates that are spaced apart from one another. The pivot axis can be defined between the pair of plates. Each plate of the pair of plates can carry one of the fold slots.

In one example, the first hub part can have a disc sandwiched between a pair of plates on the second hub part and can be pivotable about the pivot axis.

In one example, the latch shuttle can have a latching end that engages a latch notch in a perimeter of a disc of one of the hub parts in the latched orientation.

In one example, the tray part can carry a second track and the second hub part can have a tray boss captured within the second track. The second track can be at a different radial distance from the pivot axis than the fold slot and first track.

In one example, a tray boss and a second track, at least in part, can control movement of the tray when the fold joint is reoriented between the in-use and folded orientations.

In one example, the fold joint can have a hub that encloses and hides the fold pin, latch shuttle, fold slot, and first track when the fold joint is in the folded orientation, in the in-use orientation, and moving therebetween.

BRIEF DESCRIPTION OF THE DRAWINGS

Objects, features, and advantages of the present invention will become apparent upon reading the following description in conjunction with the drawing figures, in which:

FIG. 2 shows an underside close up view of a forward pivot joint for one of the front legs, basket frame parts, and bottom rails of the stroller of FIG. 1.

FIG. 3 shows an inside close up view of a slip joint for one of the rear legs and basket frame parts of the stroller of FIG. 1.

FIG. 12 shows a partial cutaway and phantom view of the left side fold joint depicted in FIG. 6 and in an in-use orientation.

FIG. 13 shows the fold joint depicted in FIG. 12 but in a partly folded orientation for the stroller of FIG. 7.

DETAILED DESCRIPTION OF THE DISCLOSURE

The disclosed stroller, tray, and fold joint constructions solve or improve upon one or more of the above-noted and/or other problems and disadvantages with prior known such stroller elements. In one example, the disclosed stroller has a tray that is automatically deployed when the stroller is reconfigured to the in-use configuration. In one example, the disclosed stroller has a tray that is automatically allowed to fold when the stroller is reconfigured to the folded configuration. In one example, the disclosed stroller has a tray that is maintained in a deployed position when the stroller is latched in the in-use configuration. In one example, the disclosed stroller has a fold joint constructed to automatically operate such a tray as discussed above. In one example, the disclosed fold joint has a fold latch construction that reduces or eliminates pinch points in the structure of the fold joint and the fold latch. In one example, the disclosed fold joint has internal components that are not exposed in either the latched or the unlatched conditions and in either the folded or in-use orientations. In one example, the disclosed fold joint has tray fold components that are not exposed in either the folded or the in-use orientations of the fold joint and the folded or the in-use configurations of the stroller. In one example, the disclosed fold joint construction helps to reduce pinch points on the fold joint and among the tray fold components in the folded and the in-use joint orientations and stroller configurations. These and other objects, features, and advantaged of the present invention will become apparent to those having ordinary skill in the art upon reading this disclosure.

Figure 1:
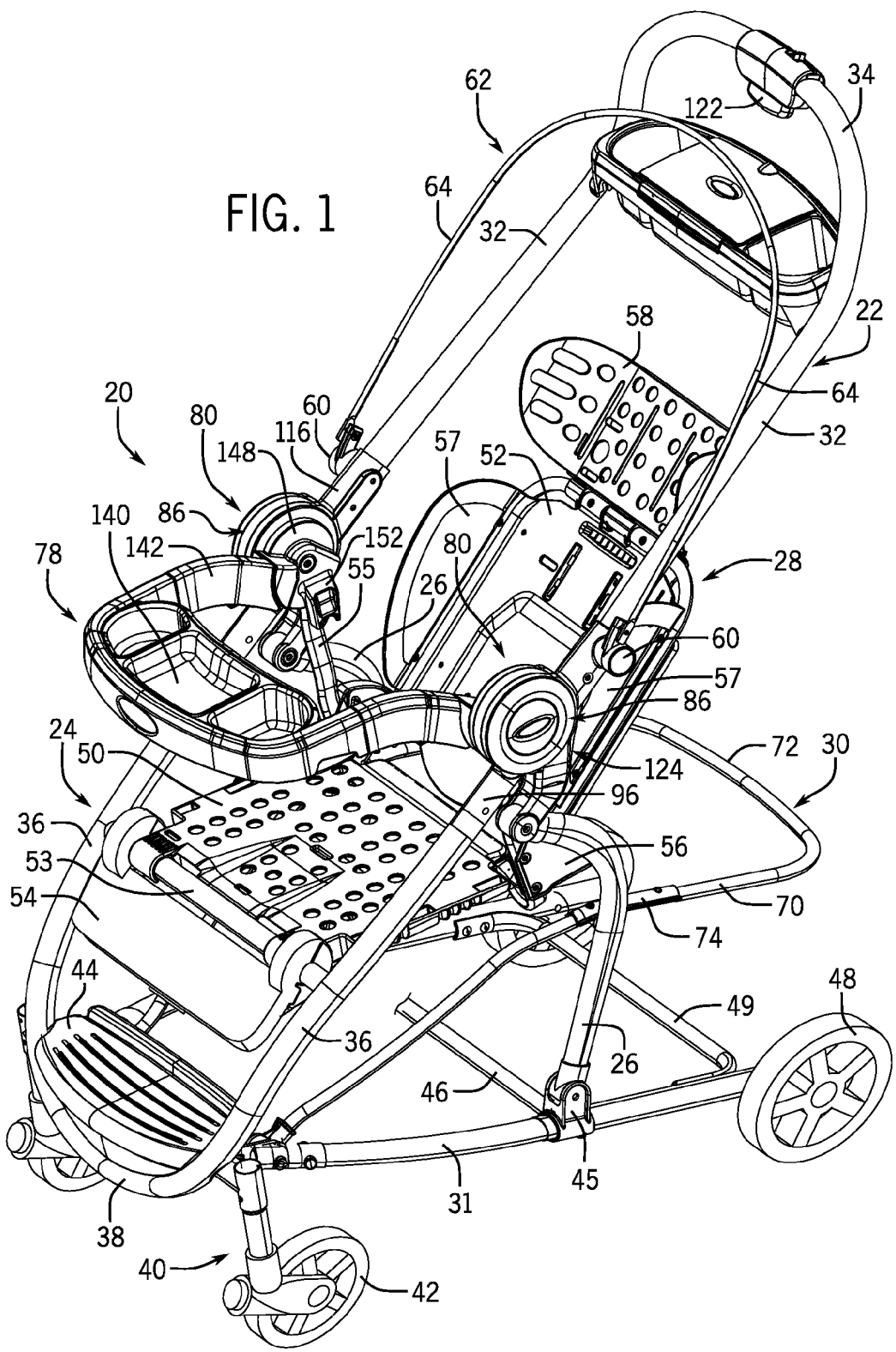
FIG. 1 shows a perspective view of one example of a stroller constructed in accordance with the teachings of the present invention and in an in-use configuration.

Turning now to the drawings, FIG. 1 shows a stroller 20 having a frame assembly constructed in accordance with the teachings of the present invention. The stroller 20 is shown herein without any soft goods for a seat, a canopy, or any other component, though a typical stroller would have such soft goods elements. In general, the frame assembly of the stroller 20 has a number of subassemblies, each having frame elements or components, which are interconnected to form the frame assembly. These subassemblies include, for example, a handle assembly 22, a front leg assembly 24, rear legs 26, a seat assembly 28, a basket frame 30, and frame bottom rails 31. The particular structure of the stroller 20 and its frame assembly can vary considerably within the spirit and scope of the present invention. In this example, the frame assembly of the stroller 20 has left and right frame sides. Each side is essentially a mirror image of the other. Thus, where appropriate herein, only one side or one frame element or component from that side may be described. The other side can essentially be considered to have a minor image element or component.

The handle assembly 22 has left and right side push arms 32 connected at their respective top ends by a handle bar 34.

The handle bar 34 extends transversely or laterally across a width of the stroller 20. The push arms 32 extend upward and rearward, terminating at the handle bar 34. The front leg assembly 24 has left and right side front legs 36 that extend forward and downward, converging toward one another near their respective lower ends, which are connected thereat by a transverse cross bar 38. The cross bar 38 also extends laterally between the front legs 36. Front wheel assemblies 40 are mounted to the lower ends of the front legs 36 and are spaced laterally apart from one another. The front wheel assemblies 40 in this example can swivel about a vertical axis, as is known in the art, and can have a single wheel 42 construction or a dual wheel construction, as is also known in the art. An optional footrest 44 is secured to the front leg assembly 24 on or near the cross bar 38 between the left and right front legs 36.

The left and right rear legs 26 each have a lower end pivotally joined to a respective one of the bottom rails 31 at a connecting joint 45. The bottom rails 31 are connected to the front leg assembly 24 at their respective forward ends and are connected to one another at about their mid-points by a cross-member 46 that extends laterally across a width of the stroller 20 between the bottom rails. A rear wheel 48 is connected at or near a rear end of each of the bottom rails 31. A second cross-member 49 also extends between the bottom rails 31 between the location of the rear wheels 48 and the location of the rear leg connecting joints 45. A combination of only one central front wheel assembly coupled to the cross bar 38 and the two spaced apart rear wheels 48 would give the stroller 20 a three wheel configuration, like many jogging strollers. However, a majority of strollers have a more conventional four wheel type construction, similar to the stroller 20. The disclosed invention will function equally well with either a three or four wheel stroller construction. The stroller 20 can be moved and rolled on the two rear wheels 48 and the two front wheel assemblies 40, as is known in the art.

The seat assembly 28 in this example is configured to support fabric soft goods (not shown) to mask the appearance of the seat structure. The seat assembly 28 has a seat bottom panel 50 and a seat back panel 52. The seat bottom panel 50 is positioned between the front legs 36 and has a front edge 53 pivotally joined to each of the front legs. An optional calf support 54 is pivotally connected in this example to the front edge 53 of the seat bottom panel 50. The calf support 54 can be raised and lowered to a user selectable position to help support the child seat occupant's legs during use. A rear edge of the seat bottom panel 50 is supported by a pair of support bars 55, one positioned on each side of the bottom panel. The rear edge of the seat bottom panel 50 is suspended from the support bars 55. A seat back bracket 56 is connected to each of the support bars 55 and/or to the rear edge of the seat bottom panel 50. The seat back panel 52 is pivotally connected to the seat back brackets 56 and extends upward from the brackets. The seat back panel 52 and the seat back brackets 56 can be configured to allow the back panel to pivot relative to the seat bottom panel 50 in order to adjust the recline or incline of the seat back relative to the seat bottom during use, as well as to assist in achieving a compact folded configuration of the stroller 20, as described below.

In this example, the seat back panel 52 has a pair of side wings 57 along the side edges of the back panel and has a headrest 58 positioned at a top edge of the back panel. The side wings 57 and headrest 58 can also be adjustable to enhance the comfort and safety of the child seat occupant, if desired. The various seat assembly components, and particularly the seat bottom panel 50 and seat back panel 52, would be covered by the soft goods during use and would likely not be visible.

A connector 60 is provided on and fixed to each of the push arms 32. A canopy frame 62, also an inverted U-shape, has left and right legs 64 with lower ends that are respectively and pivotally connected to the corresponding connectors 60. The canopy and the canopy frame arrangement are also optional and need not be provided on the stroller 20.

The basket frame 30 is configured to support or suspend a storage basket (not shown). The storage basket can be a fabric construction, a solid wall box-like container, or the like. The basket frame 30 has left and right side supports 70 that are generally horizontally oriented, but bent and tilted down slightly in a rear to front direction. The basket frame also has a rear cross-member 72 extending between and connecting the rear ends of the side supports 70. The forward ends of the side supports 70 are pivotally coupled to the front ends of the bottom rails 31 at a forward pivot joint of the frame assembly (see FIG. 2). A bearing plate 74 or contact surface is carried on each of the side supports 70 at about the mid-point. The bearing plates 74 slidably rest on bosses 76 that are coupled to and protrude inward from the rear legs 26 to form slide joints for the basket frame 30 (see FIG. 3). Portions of the side supports 70 and the rear cross-member 72 are positioned rearward of the rear legs 26 where a basket storage space would be accessible behind and under the seat assembly 28 and formed by the basket panels or soft goods (not shown).

The basket frame 30, the bottom rail cross-members 46, 49, and the seat bottom panel 50 front edge add structural integrity and strength to the frame assembly of the stroller 20, particularly across a width of the stroller. The portions of the side supports 70 connected to the bottom rails 31 and the rear legs 26 also create fold links that help the frame assembly fold up or unfold when the stroller 20 is reconfigured. As will become apparent to those having ordinary skill in the art upon reading this disclosure, the shape, component arrangement, and configuration for the frame assembly of the stroller 20 embodying features of the present invention can vary in configuration and construction from the example shown and described herein.

The disclosed stroller 20 is foldable and unfoldable between an in-use configuration, as depicted in FIG. 1, and a folded configuration as described below. In accordance with the teachings of the present invention, the stroller 20 has a tray 78 that automatically folds and deploys as the stroller is folded and unfolded. The various subassemblies on each side of the frame assembly are connected directly or indirectly to a respective left or right side fold joint 80. In general, an upper end 82 of each front leg 36 is joined directly to a corresponding one of the fold joints 80. Likewise, a lower end 84 of each push arm 32 is also joined directly to a corresponding one of the fold joints 80. The tray 78 is likewise joined directly to each fold joint 80, as described in greater detail below. The various other subassemblies forming the frame assembly of the stroller 20 are indirectly connected to the fold joints 80.

Figure 4:
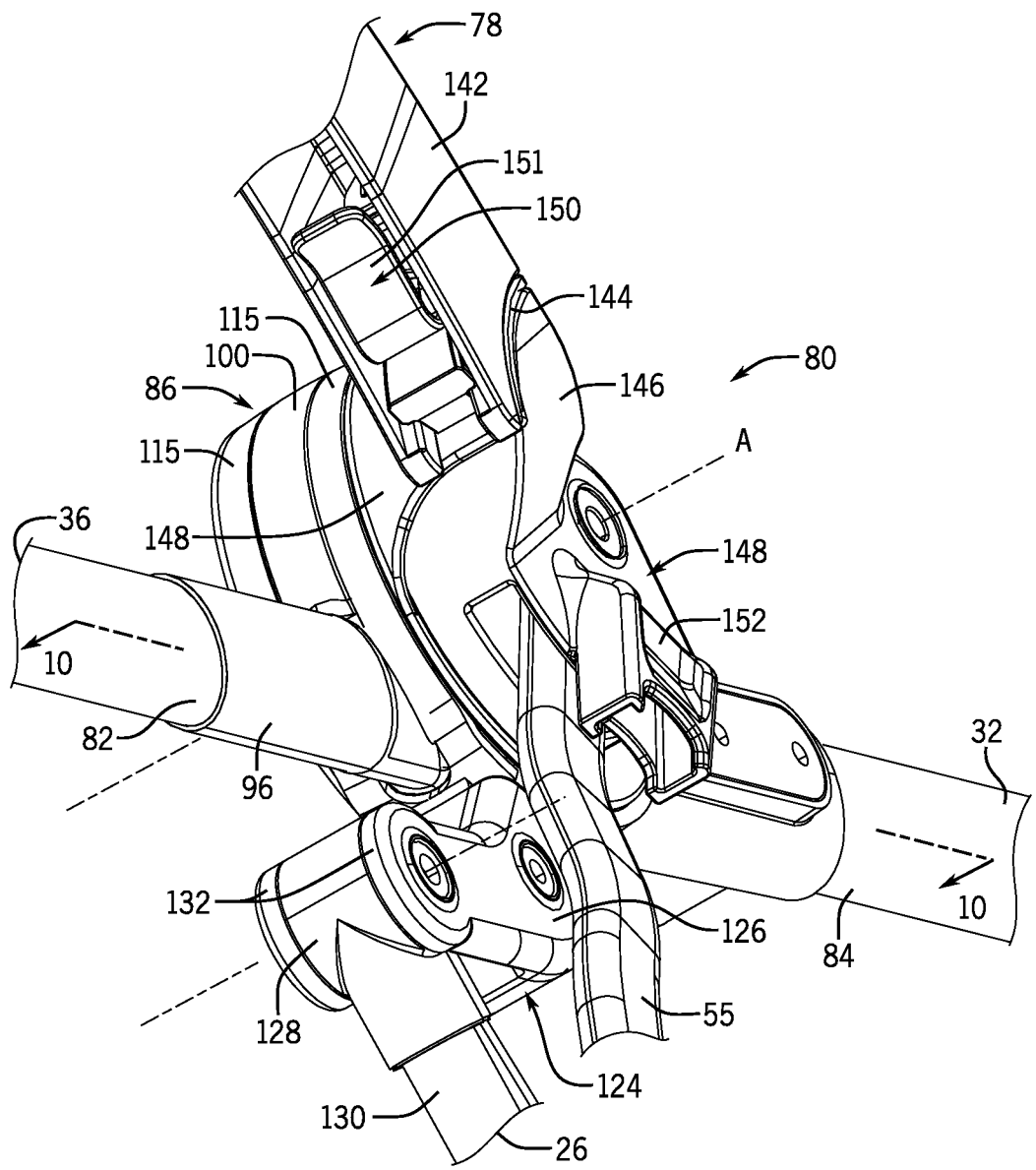
FIG. 4 shows an inside close up perspective view of one of the fold joints on the frame assembly of the stroller of FIG. 1.
Figure 5:
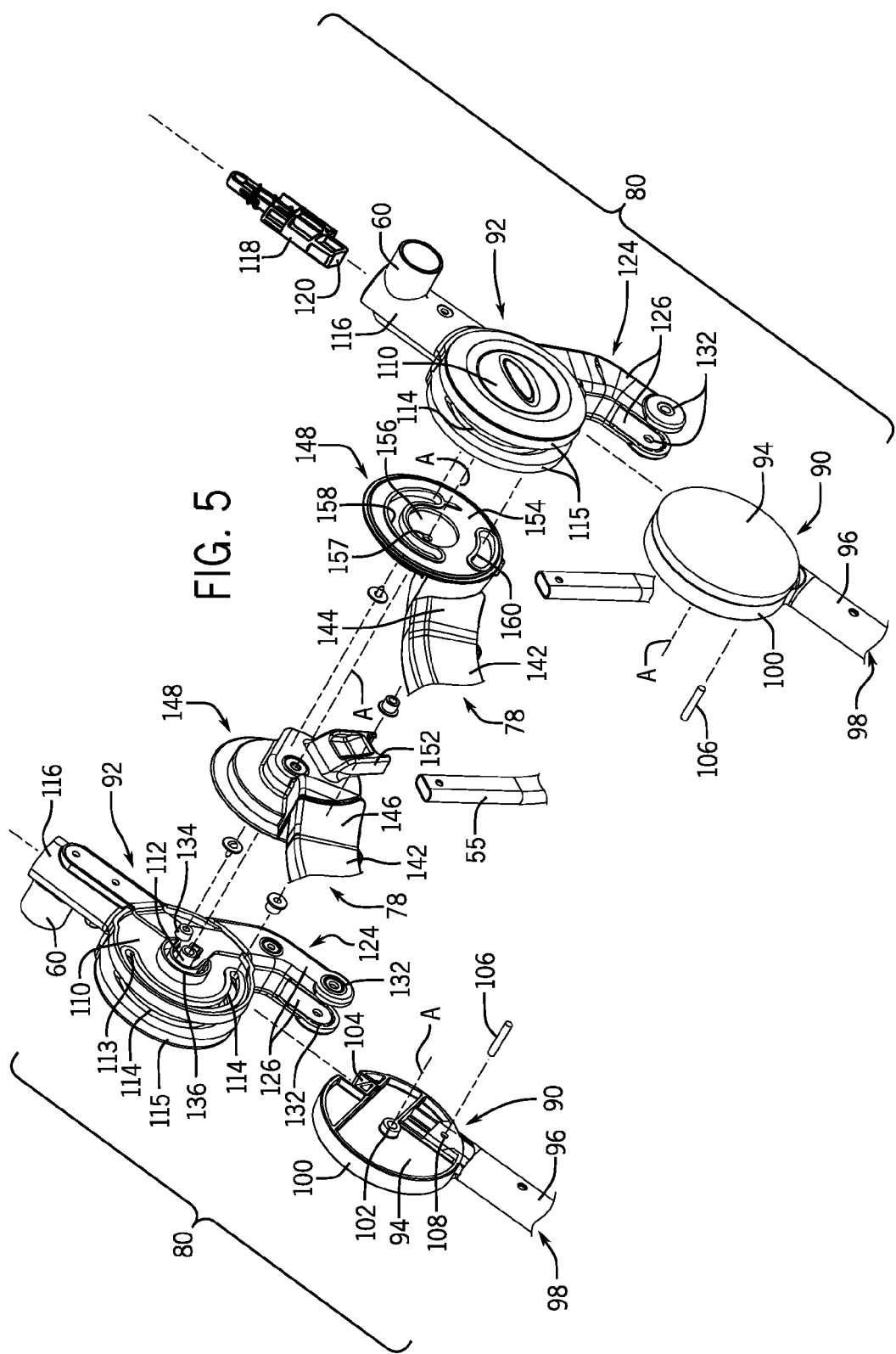
FIG. 5 shows a partial exploded view of each of the fold joints on the frame assembly of the stroller of FIG. 1.

FIG. 4 shows an inside perspective view of the right side fold joint 80 and FIG. 5 shows a partly exploded perspective view of both the left and right side fold joints. As used herein, the term "fold joint" refers to the joint structure pivotally connecting components of the frame assembly to permit folding and unfolding of the stroller 20. As used herein, the term "fold latch" refers to the components creating a locking or latching function at or within the fold joints 80 to allow or prevent pivoting movement of the components joined at the fold joint. However, these terms may be used interchangeably herein to refer generally to the structure connecting frame components of the frame assembly of the stroller 20 at the fold joint.

The fold joint 80 in the disclosed example generally has a central hub 86 that defines a pivot axis A. The components of the fold joint 80 pivot relative to one another during folding and unfolding of the stroller 20. The fold joint 80 has a first hub part 90 that defines a portion of the hub 86 and a second hub part 92 that defines another portion of the hub when the two hub parts are assembled to one another. As used herein, the terms "first" and "second" are used for convenience of description only. The first and second hub parts 90 and 92 can be inverted from the example disclosed and described herein, as can the various features and characteristics of each hub part, while still functioning as intended.

The first hub part 90 generally has a puck-shaped disc 94 connected to one end of a cylindrical hosel 96. The hosel 96 is at least partly hollow and is open at a free end 98. The upper end 82 of the front leg 36 is received in the hosel and attached to the first hub part 90 by rivets, fasteners, or the like. The disc 94 has a perimeter 100 around a substantial portion of its circumference and has a central opening 102 through the disc body that defines, in part, the pivot axis A. The hosel 96 has a lengthwise axis that is offset relative to the axis A of the central opening 102 as shown in FIG. 5. A latch notch 104 is aligned with the axis of the hosel 96 and is formed into the perimeter 100 of the disc 94 opposite the hosel. A fold pin 106 is received through a hole 108 in the body of the disc 94. The fold pin 106 protrudes from each side of the disc 94 when installed. The pin 106 is spaced radially from the central opening 102 and is also aligned with but oriented perpendicular to the axis of the hosel 96.

The second hub part 92 has two disc-shaped plates 110 that are spaced apart to form a gap or space therebetween. The plates 110 are generally of the same diameter as the puck shaped disc 94 on the first hub part 90. The width of the disc 94 is such that it fits between the plates 110 in the gap and yet can rotate relative to the plates. Each of the plates 110 has a central boss 112 with the bore therethrough aligned with and defining, in part, the pivot axis A of the fold joint 80. A curved fold slot 114 is formed through each of the plates 110 and is spaced at a radius from the axis A of the central bosses 112. Each of the fold slots 114 extends partly around, and nearly half way around in this example, the circumference of the plates 110. The fold slots 114 terminate at closed extreme ends 113, which define the length of the slots. When assembled, the exposed ends of the fold pin 106 carried on the disc 94 of the first hub part 90 are received through and captured within the respective fold slots 114. Also when assembled, the central opening 100 of the disc 94 is aligned with the bores in the central bosses 112 of the plates 110 to form the pivot axis A of the fold joint 80.

The plates 110 each have a perimeter 115 around a substantial portion of their circumference. A second hosel 116 is joined to the perimeter 115 of each of the plates 110. The aforementioned canopy connector 60 is formed as an integral part of, or attached to, the hosel 116 in this example. The second hosel 116 is hollow over its length and opens into the gap or space between the plates. The second hosel 116 is also positioned with its lengthwise axis offset from the bosses 112 and thus the pivot axis A. A latch shuttle 118 is slidable along and seated lengthwise within the second hosel 160. A latch end 120 of the latch shuttle 118 can extend into the gap between the plates 110. The lower end 84 of the push arm 32 is received in the second hosel 116 and is secured thereto by rivets, fasteners, or the like. A cable 121 is connected to the other end of the latch shuttle 118 in each of the fold joints 80.

Each cable 121 is routed upward through the respective push arm 32, through the handle bar 34, and is coupled to a release actuator 122 (see FIG. 1) on the handle bar.

A drag link 124 has two link legs 126, which are spaced apart and depend downward from the perimeter 115 of a respective one of the plates 110. A pivot coupling 128 is connected to an upper end 130 of the rear leg 26. The pivot coupling 128 is sized to fit between and pivotally connect to the lower ends 132 of the link legs 126 at a link pivot P. In this manner, the rear leg 26 is pivotally connected to the fold joint 80, but the leg pivot P is radially spaced a good distance from the fold joint pivot axis A. The rear leg 26 is also significantly curved at the upper end 130. The drag link 124 and rear leg curvature can help to create space between the pivoting parts of the rear leg 26 and the fold joint 80 during folding and unfolding. This can in turn eliminate or reduce pinch or crush points among these moving parts.

A tray boss 134 protrudes from the face of the plate 110 that faces inward on the second hub part 92 of the fold joint 80. The tray boss 134 is positioned at a radial distance from the pivot bosses 112 and thus the pivot axis A. However, this radial distance is less than the radial distance of the fold slots 114 from the pivot axis A. A cylindrical bearing wall or guide 136 also protrudes from the same face of the inner plate 110.

As shown in FIGS. 1, 4, and 5, the tray 78 has a central section 140, which can define the functional tray surfaces, storage receptacles, and the like, as desired. The central section 140 extends laterally across the frame assembly of the stroller 20 above the seat bottom panel 50 and forward of the seat back panel 52. An armrest portion 142 extends rearward from each end of the central section 140. A free end 144 of each armrest portion 142 is attached to a connector 146 on a disc shaped cover 148 of the fold joint 80. The cover 148 attached to and covers the inward face of the inner plate 110, hiding the fold latch components within the hub 86. The cover 148 serves both to create elements of the tray fold components and to close off the inner side of the hub 86.

In one example, either the armrest portion 142 or the connector 146, or both, can include all or part of a release mechanism 150. The release mechanism 150 can have a trigger or lever 151 that can be actuated to detach the tray 78 from the connectors 146 on the fold joints 80. The release mechanisms 150 allow a user to remove the tray 78, if and when needed or desired. The release mechanism 150 can be configured to automatically snap and catch or engage the tray 78 when the armrest portion 142 is pushed onto or into the connector 146 of the fold joint 80. The cover 148 also has a bracket 152 on the inside face. The bracket 152 is configured to attach to the top end of one of the seat bottom support bar 55. The support bars 55 and seat bottom panel 50 are thus suspended from the fold joints 80 in this example.

The opposite, outwardly directed face 154 of the cover 148 has a guide bore 156 located at the center of the cover. The guide bore 156 is sized to receive the bearing wall or guide 136 protruding from the inner facing plate 110 on the second hub part 92. The guide bore 156 and bearing wall or guide 136 combine to help assemble and maintain alignment between the second hub part 92 and the cover 148. A hole 157 is located at the center of the cover 148 and also aligns with the pivot axis A of the hub 86 and fold joint 80. A pivot pin or fastener (not shown) can be slipped through the hole 157 in the cover 148, the central opening 100 in the disc 94, and the bosses 112 of the plates 110 to join these parts and to create the pivot axis A.

This same face 154 on the cover 148 also has two tracks formed thereon. A first track 158 is positioned at a radius spaced from the pivot axis A so as to receive and capture the tray boss 134 therein. A second track 160 is positioned at a radius from the pivot axis A so as to align with the fold slots 114 in the plates 110 on the second hub part 92. The length of the first track 158 is about half the circumference of the cover 148. The length of the second track 160 is significantly less and, thus, is also significantly less than the length of the fold slots 114. The first track 158 terminates at extreme or closed ends 159 and the second track terminates at extreme or closed ends 161. When assembled, the tray boss 134 seats in and is captured in the first track 158 and one end of the fold pin 106 seats in and is captured in the second track 160.

The configuration and construction of the first and second hub parts 90, 92 and cover 148 can vary from the embodiment disclosed above. For example, the fold joint 80 may only have one fold slot 114. The fold joint 80 may have two of the first and second tracks 158, 160. The length, location, and relative arrangement of the slots and tracks may be varied from the embodiment disclosed. The manner in which the hub parts and cover attach to one another may be altered. These and other alternate embodiments are within the cope of the present invention.

Figure 6:
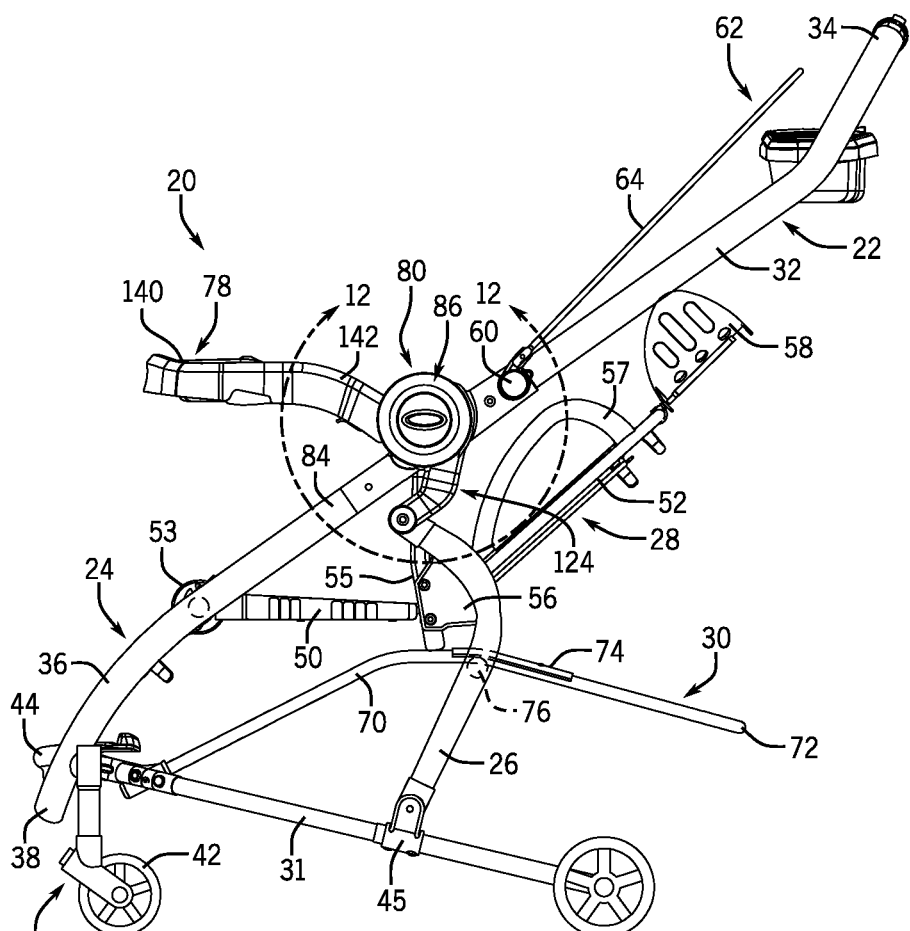
FIG. 6 shows a side view of the stroller of FIG. 1.
Figure 7:
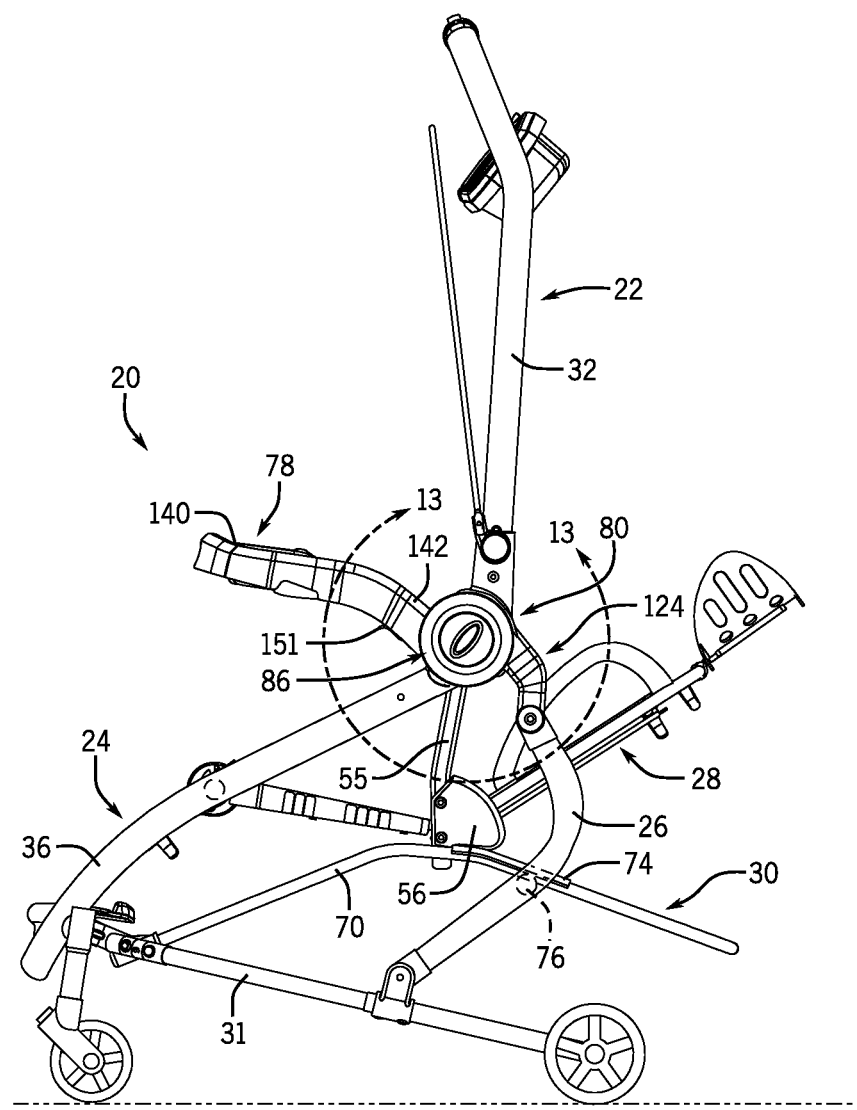
FIG. 7 shows the stroller depicted in FIG. 6 but in a partly folded configuration.

FIGS. 1 and 6 illustrate the stroller 20 in the in-use configuration. FIGS. 6-9 show the stroller 20 and its frame assembly as it is being folded from the in-use configuration to the completely folded configuration. With reference to FIGS. 1 and 6, the user can fold the stroller 20 by first actuating the release actuator 122 on the handle bar 34 of the handle assembly 22. Actuating, i.e., squeezing or depressing, the release actuator 122 releases the fold joints 80, as described in greater detail below. This allows the user to fold the stroller 20. FIG. 7 shows the stroller 20 in a partly folded configuration. The user can push the handle bar 34 forward to begin to fold the stroller 20. By doing so, the push arm 32 will rotate the second hub part 92 relative to the first hub part 90. This in turn will begin to rotate the drag link 124 and push the upper end 130 of the rear leg 26 in a rearward direction. Movement of the rear leg 26 begins to drop the rear leg downward. This in turn will allow the basket frame 32 to also drop downward as the bearing plate 74 slides on the boss 76 on the rear leg 26.

Figure 8:
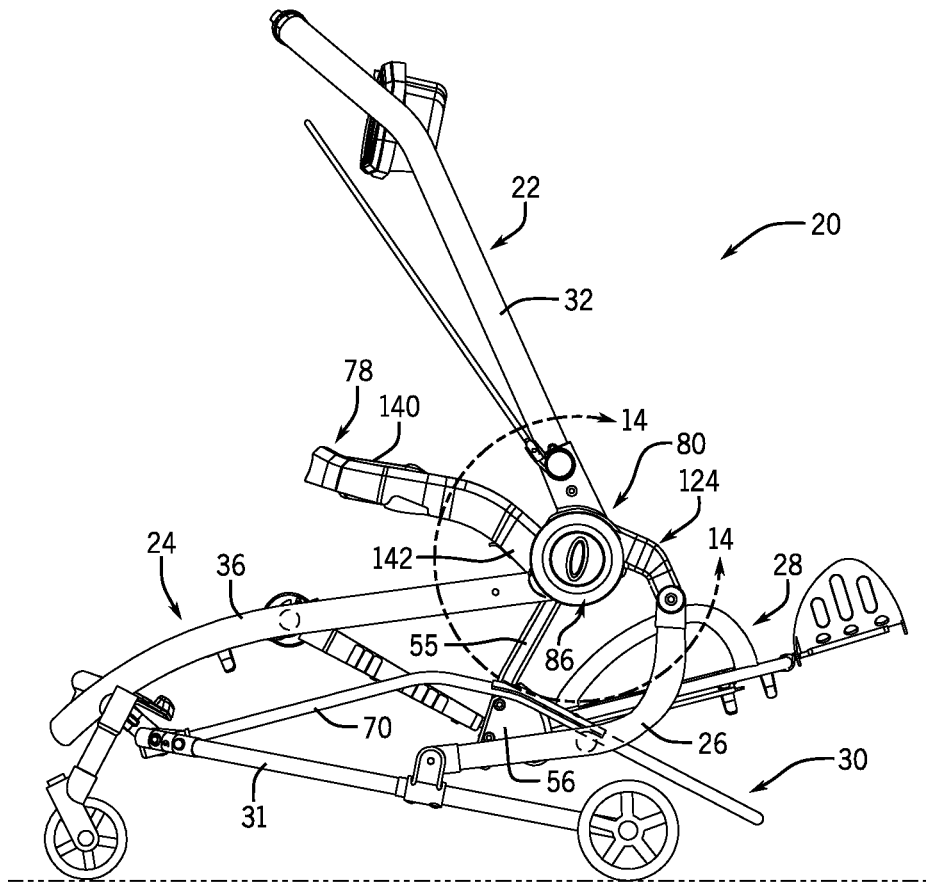
FIG. 8 shows the stroller depicted in FIG. 7 but in a further folded configuration.

As the rear leg 26 moves rearward and its upper end 130 moves downward, the fold joint 80 moves downward. This in turn begins to drop the front leg 36 as depicted in FIG. 8. In this example, the seat back panel 52 folds rearward toward a reclined orientation relative to the seat bottom panel 50 as the stroller 20 is folded. As will be described in greater detail below, the tray 78 is freed from its deployed position when the handle assembly 22 is pushed forward, changing the orientation of the fold joint 80. The tray 78 is then free to fold up as the stroller 20 and its frame assembly is folded, but at a rate different than the components to which it is connected. If the tray were rotationally affixed to any of these folding components, the tray 78 would interfere with one part or another of the stroller 20 during folding.

Figure 9:
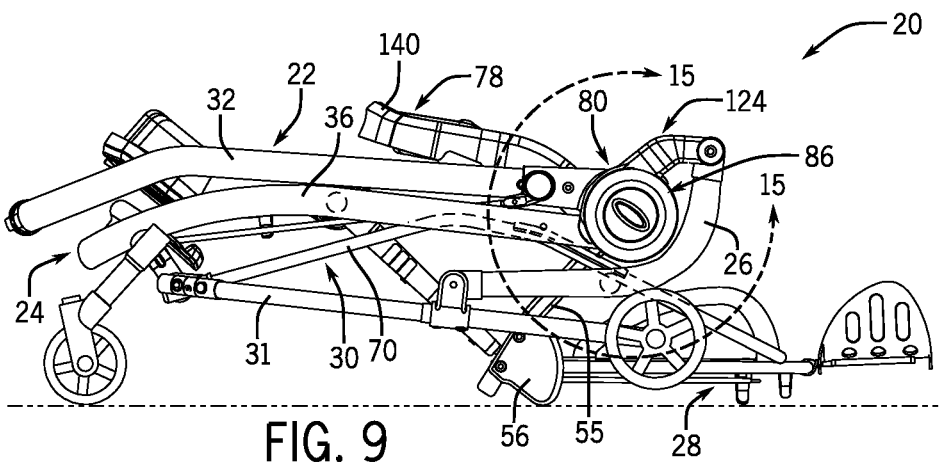
FIG. 9 shows the stroller depicted in FIG. 8 but in a completely folded configuration.

FIG. 9 shows the stroller 20 in the completely folded configuration. The handle assembly 22 is collapsed onto the front leg assembly 24. Likewise, the front leg assembly 24 is collapsed toward the bottom rails 31. The curved rear legs 26 are collapsed downward with their lower ends adjacent the bottom rails 31 and with the curved upper ends 130 bent around the fold joints 80. The seat bottom panel 50 and seat back panel 52 are also generally aligned with one or more of the frame assembly components and/or lie within the collapsed height of these frame components. The tray 78 lies between the push arms 32 of the handle assembly 22 and is closely aligned with the push arms in this example. In other examples, the tray could be designed to be positioned lower and completely within the collapsed height of these frame components.

Figure 10:
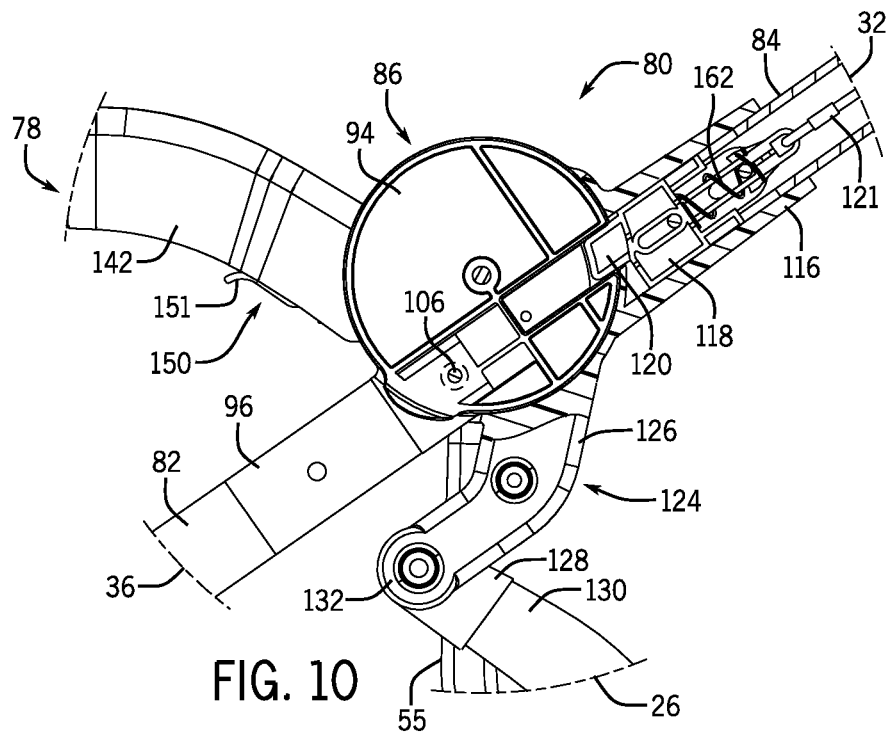
FIG. 10 shows a cross-section taken along line 10-10 of the fold joint depicted in FIG. 4 and in a latched condition.
Figure 11:
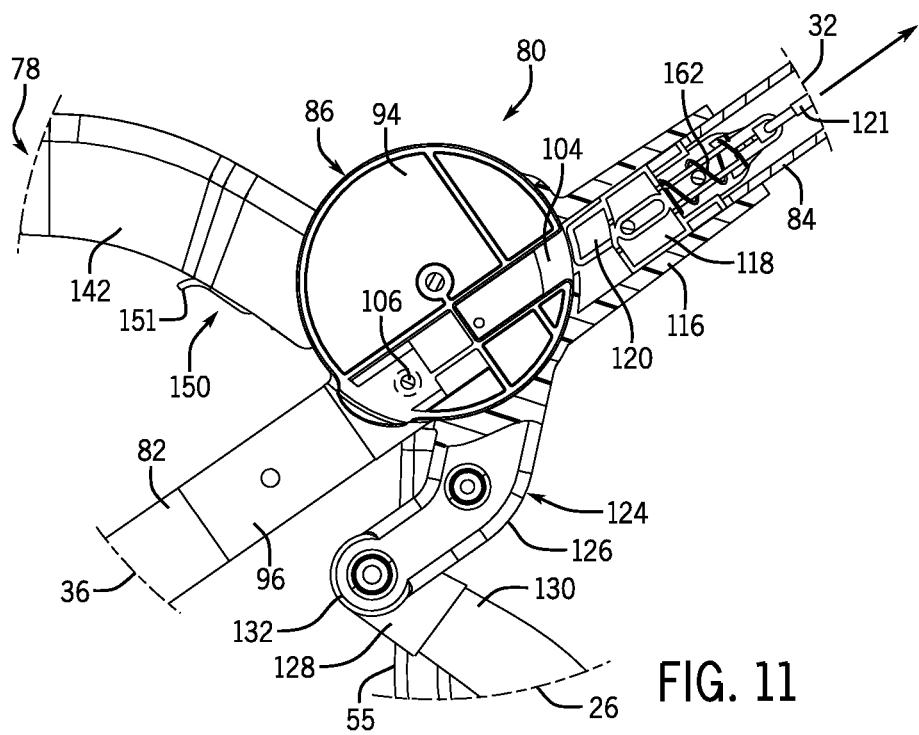
FIG. 11 shows the fold joint of FIG. 10 but in an unlatched condition.

FIGS. 10 and 11 show the fold latch components of the fold joint 80 in a latched condition and an unlatched or released condition, respectively. As can be seen in FIG. 10, in the latched condition, the latch end 120 of the latch shuttle 118 is seated in the latch notch 104 in the perimeter 100 of the first hub part 90. In this condition, the first hub part 90 is prevented from rotating relative to the second hub part 92. Thus, the fold joint 80 is retained in a latched orientation as depicted in FIG. 10 and the stroller 20 is locked in the in-use configuration. When the user actuates the release actuator 122, this pulls on the cable 121 in the direction of the arrow R in FIG. 11, withdrawing the latch end 120 of the shuttle 118 from the latch notch 104. This disengages the fold joint 80 and releases the frame assembly of the stroller 20, permitting it to fold. A spring 162 is provided in this example on the latch shuttle 118. The spring 162 can bias the latch shuttle toward the engaged or latched condition of FIG. 10. Actuating the release actuator 122 pulls the cable 121 against the bias force of the spring 162. When the actuator 122 is released, the latch shuttle 118 will be biased in the direction of latching by the spring 162.

When the stroller 20 is unfolded from the completely folded configuration of FIG. 9 to the in-use configuration of FIGS. 1 and 6, the user need only lift the handle bar 34 and raise the handle assembly 22, which will unfold the stroller as shown from FIG. 9 to FIG. 6. When the frame assembly reaches the in-use configuration and the fold joint achieves the in-use orientation, the spring 162 will fire the latch shuttle 118 and the latch end 120 into the latch notch 104 once aligned.

The function of the automatic folding tray 78 and the associated components in the fold joint 80 are described with reference to FIGS. 12-15. FIG. 12 shows the fold joint 80 in the in-use orientation that coincides with the stroller 20 in the in-use configuration of FIGS. 1 and 6. As can be seen, the fold pin 106 is seated at one extreme end 113 of the fold slots 114. This prevents the push arm 32 from being rotated any further rearward and downward, helping to align the latch shuttle 118 with the latch notch 144 this configuration. The tray boss 134 is seated at one extreme end 159 of the first track 158 in the cover 148 of the fold joint 80. Likewise, the fold pin 106 is seated at one extreme end 161 of the second track 160 and the cover 148. Thus, in the in-use orientation of the fold joint 80, the tray 78 is retained in the deployed position by hard stops in both directions, the hard stops being created by interference between the pin and boss and the respective slot and track extreme ends. The fold pin 106 and the second track 160 prevent the tray 78 from being raised any further. The tray boss 134 and the first track 158 prevent the tray from being lowered any further.

FIG. 13 shows the fold joint 80 in a partly folded orientation that coincides with the stroller 20 in the partly folded configuration of FIG. 7. As the push arm 32 is rotated counterclockwise in this view in the direction of the arrow F during folding, the fold slots 114 rotate counterclockwise in this view as well. This releases the fold pin 106 from the extreme ends 113 of the fold slots 114. As the push arm 32 is rotated, the second hub part 92 is also rotated, which in turn moves the tray boss 134 about the pivot axis A. The tray boss 134 is then released from the extreme end 159 of the first track 158 in the cover 148. The fold pin 106, however, is still seated at the extreme end 161 of the second track 160 in the cover 148. Thus, the tray 78 can still not be raised any further from the deployed position. However, the tray 78 is free to pivot downward because the tray boss 134 is now slidable in either direction in the first track 158.

Figure 14:
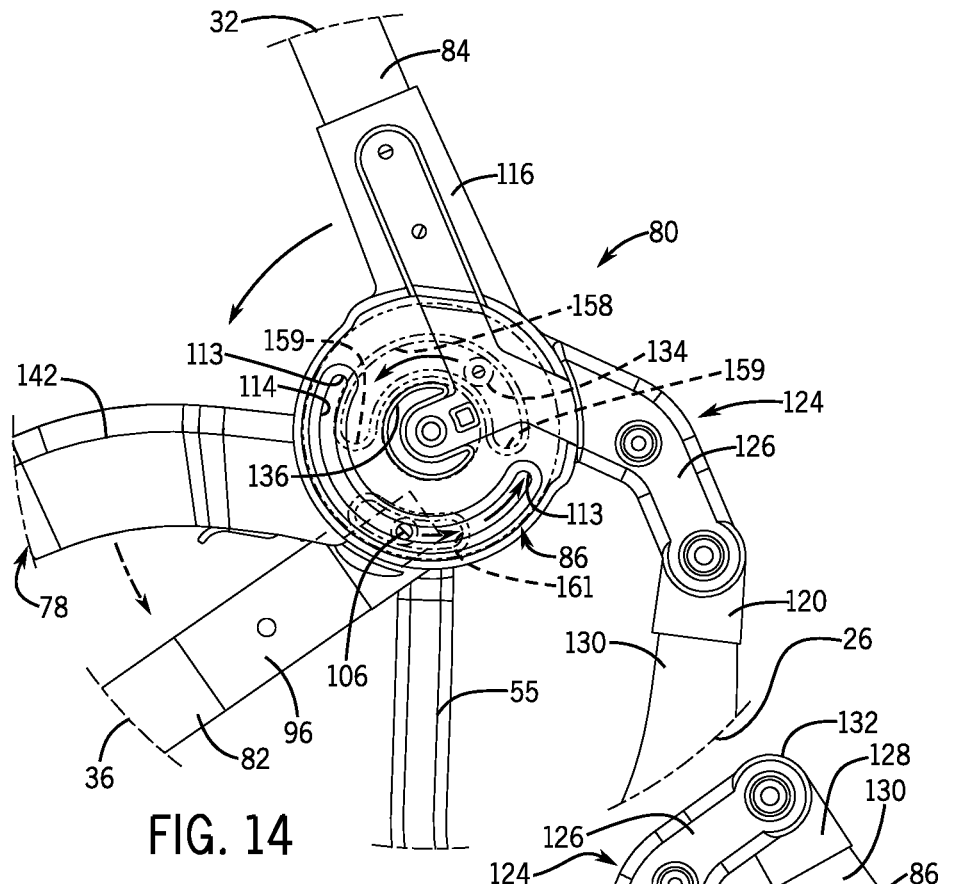
FIG. 14 shows the fold joint depicted in FIG. 13 but in a further folded orientation for the stroller of FIG. 8.
Figure 15:
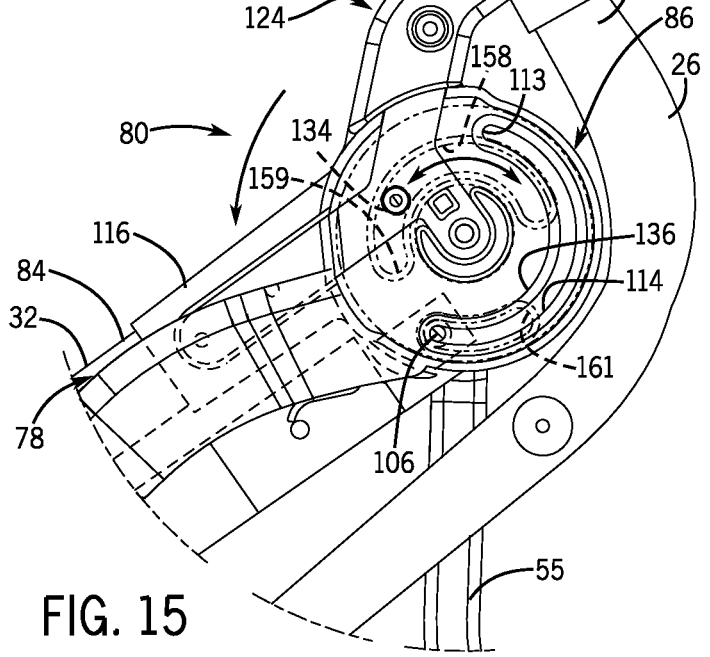
FIG. 15 shows the fold joint depicted in FIG. 14 but in a completely folded orientation for the stroller of FIG. 9.

FIG. 14 shows the fold joint 80 in a further folded orientation that coincides with the stroller 20 in the further folded configuration of FIG. 8. As the push arm 32 is further rotated in the direction of the arrow F, the tray 78 can be pushed down manually or gravity can draw the tray downward. As the tray 78 drops or rotates down, the second track 160 will begin to rotate counterclockwise, releasing the fold pin 106 from the extreme end 161 of the track. Similarly, the track boss 134 moves further along the first track 158. In this orientation of the fold joint 80, the tray 78 is free to move, at least to a degree, in either the upward or downward direction. FIG. 15 shows the fold joint 80 in the completely folded orientation that coincides with the stroller in the completely folded configuration of FIG. 9. In this orientation, the tray is moved downward as far as it can go. The fold pin 106 is now bottomed against the opposite extreme end 161 of the second track 160 in the cover 148. The tray 78 is still free to be raised upward, at least somewhat, because the tray boss 134 is not positioned at either extreme end of the first track 158 and because the fold pin 106 would allow the second track 160 to rotate in a clockwise direction in this view at least to the degree permitted by the length of the second track. In an alternate embodiment, the track 158 could be shorter and the tray boss 124 could seat against the other extreme end 159 earlier in the fold process. This would then result in optional hard stops for the tray 78 in both directions when in the folded position as well.

When the stroller 20 is unfolded from the completely folded configuration of FIG. 9 toward the in-use configuration of FIGS. 1 and 6, the tray 78 will automatically return to its deployed position. As the push arm 32 is rotated clockwise opposite the direction of the arrow F, the fold pin 106 will eventually bottom against the one extreme end 113 of the fold slots 114. More importantly, the tray boss 134, which moves in conjunction with the push arm 32 and the second hub part 92 along first track 158, will bottom against the extreme end 159. This hard stop will then rotate the tray 78 upward to the deployed position.

As will be evident to those having ordinary skill in the art, the particular configuration and construction of the stroller 20 and its frame assembly disclosed and described herein can vary within the scope of the present invention. Likewise, the specific orientation and arrangement of the fold joint components, including the plates 110, disc 94, fold slots 114, fold pin 106, first and second tracks 158, 160, and tray boss 134, can vary and yet prevent or allow the tray 78 to fold and function as intended. The bosses, pins, tracks, and slots can be reversed so that the slots 114 are stationary and the pins 106 move, and the like. The fold parameters and characteristics of the tray 78 may be altered by altering the relative positioning of components, the track and slot lengths, their links, their spatial relationship to one another, and the like. The term tray as used herein can equate to a conventional storage tray on a stroller or can equate to an arm bar that folds and functions in the same manner, even though it may not provide storage receptacles or a tray-like support surface for the seat occupant to use.

The disclosed tray 78 and fold joint 80 allow some play in the positioning of the tray about the pivot axis A, at least when the stroller 20 is in a partly folded or unfolded configuration. However, there may be a need for the tray 78 to have some type of breakaway release or clutch mechanism that will allow the stroller 20 to be folded, even when something unintentionally blocks or prevents the tray 78 from folding. Such a mechanism could inhibit or prevent the fold joint components from breaking when the stroller 20 is folded under such conditions. In one example, the earlier mentioned calf support 54 could be in an upward raised orientation when the stroller 20 is folded. The calf support 54 may then interfere with the tray as the stroller is folded. Without any type of breakaway release or clutch mechanism, the stroller might be prevented from being completely folded and/or the fold joint (or at least the portion of the fold joint related to folding of the tray) may break.

Figure 16:
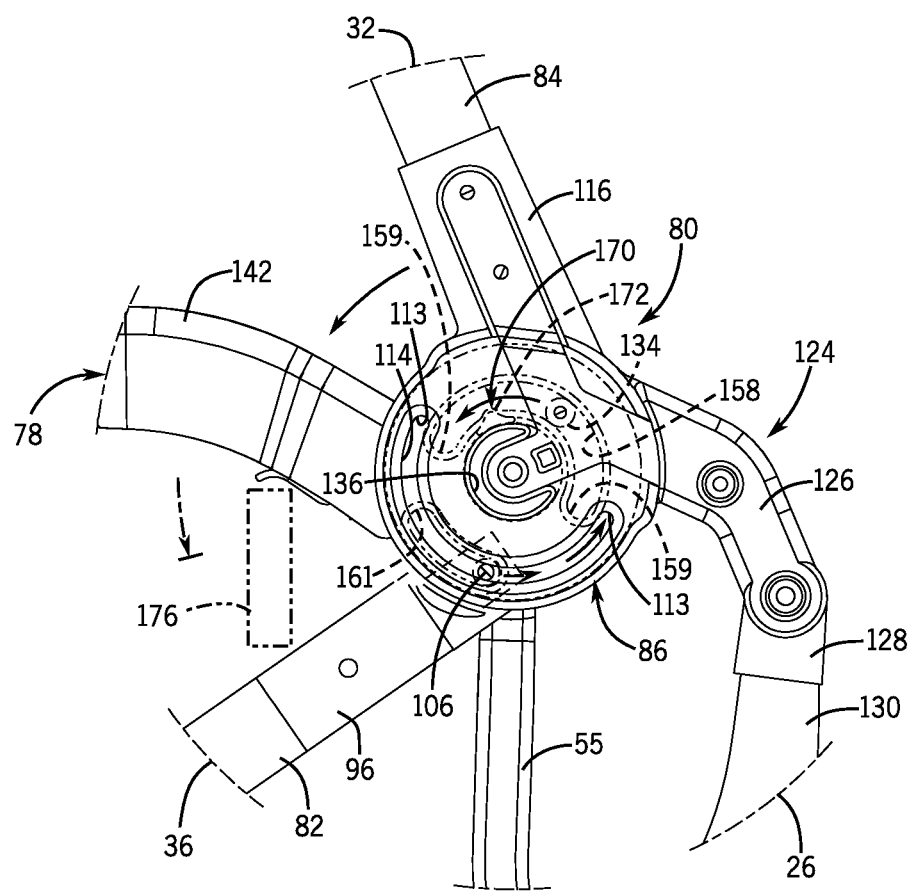
FIG. 16 shows a partial cutaway and phantom view of another example of a fold joint constructed in accordance with the teachings of the present invention and having an optional tray fold clutch.

FIG. 16 shows one example of a simple clutch mechanism 170 that can be incorporated to alleviate this problem. In this example, the first track 158 can be provided with a resilient stop or detent forming the clutch mechanism 170 on at least one wall of the track. As shown, a resilient bridge 172 is formed integral with the material of the cover 148 and track 158. The bridge 172 protrudes inward into the track 158 and a void (not shown) can be disposed behind the bridge 172 in the wall of the track or the body of the cover 148. The void can allow the bridge 172 to flex toward the track wall and allow the tray boss 134 to bypass the clutch. Under normal conditions, the tray boss 134 and bridge 172 can be positioned so that the boss does not bypass the bridge and instead pushes the tray 78 toward the folded position. However, if the stroller 20 were being folded and the tray 78 were to hit an obstruction 176 before the frame assembly was completely folded, the bridge could resiliently flex and allow the tray boss 134 to bypass the bridge as the push arm 32 is further folded downward. This would release the tray from also folding further downward and avoids the stroller 20 not being able to fully fold and/or avoids breaking components within the fold joint 80.

Other types of tray release or clutch mechanisms can also be incorporated to alleviate this concern. The invention need not have such a clutch mechanism. However, if such a mechanism is included, it can vary from the example shown and described above.

The disclosed automatic folding tray concept is a simple, robust, and cost effective structure and method to provide a child's tray that folds automatically with a stroller. Also, a key deliverable for the disclosed tray is that, during the transition between the folded state and the unfolded state, there are no openings that reduce in size that could pinch/crush an extremity on the caregiver or the child. The latch shuttle 118, including the latch pin 120, is completely enclosed at all times within the fold joint 80, and particularly the hub 86. Likewise, the tray 78 and the various slots, tracks, pins, and bosses that effect automatic folding of the tray are also completely hidden within the structure of the fold joint 80 and the hub 86. The covers 148 close off the inner side of each fold joint 80. The outer surface of the outside plate 110 on the second hub part closes the other side of each fold joint. The perimeters 100 and 115 of the corresponding disc 94 and plates 110 also act to close off the fold joint 80.

The above noted problems have been improved upon or solved by the disclosed automatically folding tray construction. Two hard stops are provided in the fold joint hub and are configured to drive and lock the orientation of the child's tray. The hard stops are created by contact between the fold pin within the fold slots and second fold track and between the tray boss and the first fold track. These components are internal to the fold joint hub and the armrest or tray pivot hubs so as to prevent any child finger crush or pinch points. These hard stops could be reversed if the fold joint is set up to rotate during folding in an opposite direction or orientation.

During the fold action, one of the hard stops can hit an opposite extreme end of a slot or track. This can be utilized to drive the tray down to a secure folded state. This last drive can be optional, depending on whether the specification of the stroller is to have the tray snug and immovable when folded or whether the tray can float or pivot slightly in the folded position.

For good performance of the automatic folding tray described above, one can keep the slots, tracks, and hard stops as far as possible (as permitted by the hub geometry) from the central pivot axis of the fold joint. This can be done to reduce the loads on the hard stops when a force is applied to the child's tray during use. Also, the hard stops may be formed or provided as large as possible (as permitted by the hub geometry) to increase the surface area contact between the hard stops and the ends of the slots and tracks.

In order to prevent the hard stops from pushing out of the slots or tracks when the tray is loaded, fasteners can be used to keep the armrest pivot hub from separating from the latch, as shown in FIG. 5. The slots and tracks can all be open through-slots, blind tracks, or a combination thereof, as in the example disclosed and described herein. The hard stops can be made out of a tough plastic or other suitable material, such as nylon, in order to support heavy loads while limiting the weight of the components. The hard stops do not necessarily need to ride in slots. Each hard stop could have pairing or mating hard stops that are found on the armrest cover or pivot hub that react against one another. However, such a design would have to take into account an increased risk that the hard stops might slip past one another during loading of the tray. The disclosed automatically folding tray can be constructed utilizing existing major components found on a fold joint hub of a stroller. The tray and cover, including the tracks, would be added, at least, in order to create this functionality. This can minimize the cost impact and reduce complexity of the design, while providing the enhanced performance of automation of the tray position adjustment and folding.

The disclosed tray automatically folds and deploys without additional effort needed by the caregiver. The tray fold mechanisms (hard stop design) can be 100% internal to the pivot hub or fold joint assembly so that no pinch, shear, or crush hazard for the child or caregiver exists.

Although certain stroller, fold joint, tray, and tray fold components and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller comprising:
a frame assembly reconfigurable between an in-use configuration and a folded configuration;
a fold joint on the frame assembly that, when in a latched orientation, retains the frame assembly in the in-use configuration;
a seat assembly supported by the frame assembly;
a tray extending across and spaced forward from the seat assembly; and
a tray boss protruding from part of the fold joint,
wherein the tray boss is coupled to a portion of the tray and is configured to
a) move the tray to a deployed position relative to the seat assembly when the frame assembly is moved to the in-use configuration,
b) retain the tray in the deployed position when in the in-use orientation, and
c) release and allow the tray to move to a folded position when the frame assembly is moved to the folded configuration.

2. The stroller according to claim 1, wherein the fold joint has a fold slot and a fold pin that is captured within the fold slot.

3. The stroller according to claim 2, wherein the fold pin is held stationary and the fold slot moves about the pivot axis with part of the frame assembly.

4. The stroller according to claim 1, wherein the frame assembly includes a handle assembly that is pivoted about the fold joint to reconfigure the frame assembly between the folded and unfolded configurations.

5. The stroller according to claim 1, wherein the fold joint has first and second hub parts pivotally coupled to one another and has a third hub part coupled to the tray and being pivotable about a pivot axis relative to the first and second hub parts.

6. The stroller according to claim 5, wherein the first, second, and third hub parts combine to form a hub.

7. The stroller according to claim 6, wherein the fold joint has a fold latch, a fold pin, a fold slot, a tray boss captured within a first track, and a second track, the fold pin captured within the fold slot and the second track.

8. The stroller according to claim 7, wherein the first, second, and third hub parts define a hub that covers and hides the fold latch, the fold pin, the fold slot, the tray boss, and the first and second tracks, whether the fold joint is in the in-use orientation or a folded orientation or moving therebetween.

9. The stroller according to claim 1, wherein the tray boss is blocked from moving in one direction by a fold pin of the fold joint and in an opposite direction by one extreme end of a track when retained in the deployed position.

10. The stroller comprising:
a frame assembly reconfigurable between an in-use configuration and a folded configuration;
a fold joint on the frame assembly that, when in a latched orientation, retains the frame assembly in the in-use configuration;
a seat assembly supported by the frame assembly; and
a tray extending across and spaced forward from the seat assembly,
wherein the fold joint is coupled to a portion of the tray and is configured to
a) move the tray to a deployed position relative to the seat assembly when the frame assembly is moved to the in-use configuration,
b) retain the tray in the deployed position when in the in-use orientation, and
c) release and allow the tray to move to a folded position when the frame assembly is moved to the folded configuration,
wherein the fold joint has a fold latch, a fold pin, a fold slot, a tray boss captured within a first track, and a second track, the fold pin captured within the fold slot and the second track.

11. The stroller according to claim 10, wherein the fold joint includes a hub that covers and hides the fold latch, the fold pin, the fold slot, the tray boss, and the first and second tracks, whether the fold joint is in the in-use orientation or a folded orientation or moving therebetween.

12. A fold joint for a stroller comprising:
a first hub part fixed to a first frame element;
a second hub part fixed to a second frame element, the first and second hub parts pivotable relative to one another about a pivot axis between an in-use orientation and a folded orientation;

a latch shuttle movable between a latched position locking the first and second hub parts in the in-use orientation and an unlatched position unlocking the first and second hub parts;

a fold pin carried on one of the first and second hub parts;

a fold slot carried on the other of the first and second's hub parts at a radial distance from the pivot axis; and a tray having a tray part coupled to and pivotable about the pivot axis relative to the first and second hub parts, the tray part having a first track at the same radial distance from the pivot axis, wherein the fold pin is captured in both the fold slot and the track and which, at least in part, controls movement of the tray when the fold joint is reoriented between the in-use and folded orientations.

13. The fold joint according to claim 12, wherein the first frame element is a front leg of a frame assembly of the stroller and wherein the second frame element is a push arm of a handle assembly of the frame assembly.

14. The fold joint according to claim 12, wherein the second hub part has a pair of plates that are spaced apart from one another and the pivot axis is defined through and generally perpendicular to the pair of plates, and wherein the first hub part has a disc sandwiched between the pair of plates.

15. The fold joint according to claim 12, wherein the second hub part has two of the fold slots, a pair of plates that are spaced apart from one another, and the pivot axis is defined between the pair of plates, and wherein each plate of the pair of plates carries one of the fold slots.

16. The fold joint according to claim 15, wherein the first hub part has a disc sandwiched between the pair of plates and pivotable about the pivot axis.

17. The fold joint according to claim 16, wherein the latch shuttle has a latching end that engages a latch notch in a perimeter of the disc in the latched orientation.

18. The fold joint according to claim 12, wherein the tray part carries a second track and the second hub part carries a tray boss captured within the second track, the second track being at a different radial distance from the pivot axis than the fold slot and first track.

19. The fold joint according to claim 18, wherein the tray boss and second track, at least in part, control movement of the tray when the fold joint is reoriented between the in-use and folded orientations.

20. The fold joint according to claim 12, further comprising a hub that encloses and hides the fold pin, latch shuttle, fold slot, and first track when the fold joint is in the folded orientation, in the in-use orientation, and moving therebetween.

* * * * *